(12) United States Patent
Veal

(10) Patent No.: US 6,626,620 B1
(45) Date of Patent: Sep. 30, 2003

(54) LOAD RETAINING APPARATUS ON A VEHICLE

(76) Inventor: James B Veal, P.O. Box 152, Hortense, GA (US) 31543

( * ) Notice: Subject to any disclaimer, the term of this patent is extended or adjusted under 35 U.S.C. 154(b) by 0 days.

(21) Appl. No.: 09/683,320

(22) Filed: Dec. 13, 2001

Related U.S. Application Data

(60) Provisional application No. 60/256,074, filed on Dec. 15, 2000.

(51) Int. Cl.$^7$ .................................................. B60P 7/08
(52) U.S. Cl. ............................ 410/36; 410/34; 410/42; 410/97; 410/117
(58) Field of Search ........................... 410/36, 34, 42, 410/97, 96, 117, 118; 24/712, 713.3, 713.4, 713.6; 224/403, 534, 318, 328; 206/443, 592; 138/96 R

(56) References Cited

U.S. PATENT DOCUMENTS

| | | | | |
|---|---|---|---|---|
| 518,207 A | * | 4/1894 | Cassaday et al. | 410/34 |
| 2,417,336 A | * | 3/1947 | Whitehead | |
| 2,942,625 A | * | 6/1960 | Costanzo | |
| 3,587,654 A | * | 6/1971 | Yocum | |
| 4,720,135 A | * | 1/1988 | Farina | |
| 4,964,771 A | * | 10/1990 | Callihan | 410/118 |
| 5,516,244 A | * | 5/1996 | Baka | 410/36 |
| 5,848,864 A | * | 12/1998 | Selby | 410/97 |
| 5,915,899 A | * | 6/1999 | Dennis | 410/36 |
| 6,152,664 A | * | 11/2000 | Dew et al. | 410/100 |
| 6,210,087 B1 | * | 4/2001 | Bacon | 410/35 |

* cited by examiner

Primary Examiner—Stephen T. Gordon
(74) Attorney, Agent, or Firm—Ridgon Patents & Engineering, P.C.; Jonathan R. Smith

(57) ABSTRACT

A flexible bag is equipped with grommets and cords enabling it to be placed over one end of a load of material and secured to a vehicle, thus preventing the load from shifting in transit. The bag is shaped to facilitate its placement on the load, and to conform the bag to the shape of the load, thereby reducing slipstream damage to the bag. The bag may also be equipped with brightly colored anti-collision devices.

1 Claim, 6 Drawing Sheets

# LOAD RETAINING APPARATUS ON A VEHICLE

CROSS REFERENCE RELATED APPLICATIONS

This application claims priority of provisional application No. 60/256,074 filed Dec. 15, 2000.

BACKGROUND OF INVENTION

A common problem with hauling long loads in vehicles is that the center of gravity of the load may shift rearward due to acceleration and cause the load to fall off or destabilize the vehicle. This often occurs in pickup trucks, and is made more likely by bed liners, which typically have a lower coefficient of friction than the vehicle paint. Simply tying the load down, while increasing the frictional retentive force somewhat, may be insufficient to prevent this shift. An apparatus is needed to prevent this shift positively, quickly, and inexpensively.

SUMMARY OF THE INVENTION

This invention is a flexible grommetted shroud that can be pulled over the end of a load, e.g., lumber, and tied by means of rope, twine, strap or an extension of the shroud itself (collectively referred to here as "ties") to cleats on the truck so as to prevent rearward movement of the load. (Such a shroud could likewise be placed over the front of the load, but usually the truck cab is sufficient to limit forward motion.) An object of this invention is to improve the security with which a load can be held in a vehicle. A further object of the invention is to provide this increased security inexpensively. It is another object of the invention to reduce the time it takes to secure a load in a vehicle. It is another object of this invention to provide weatherproof cover for the load in combination with this security. It is another object of the invention to retain the load without having to lift up the load to fasten it. It is another object of the invention to provide an extended load warning flag with the additional load retention security. It is a further object of the invention to provide a strengthened grommet attachment to cloth for withstanding the shifting forces created by a load in acceleration.

DETAILED DESCRIPTION

Figure 1:
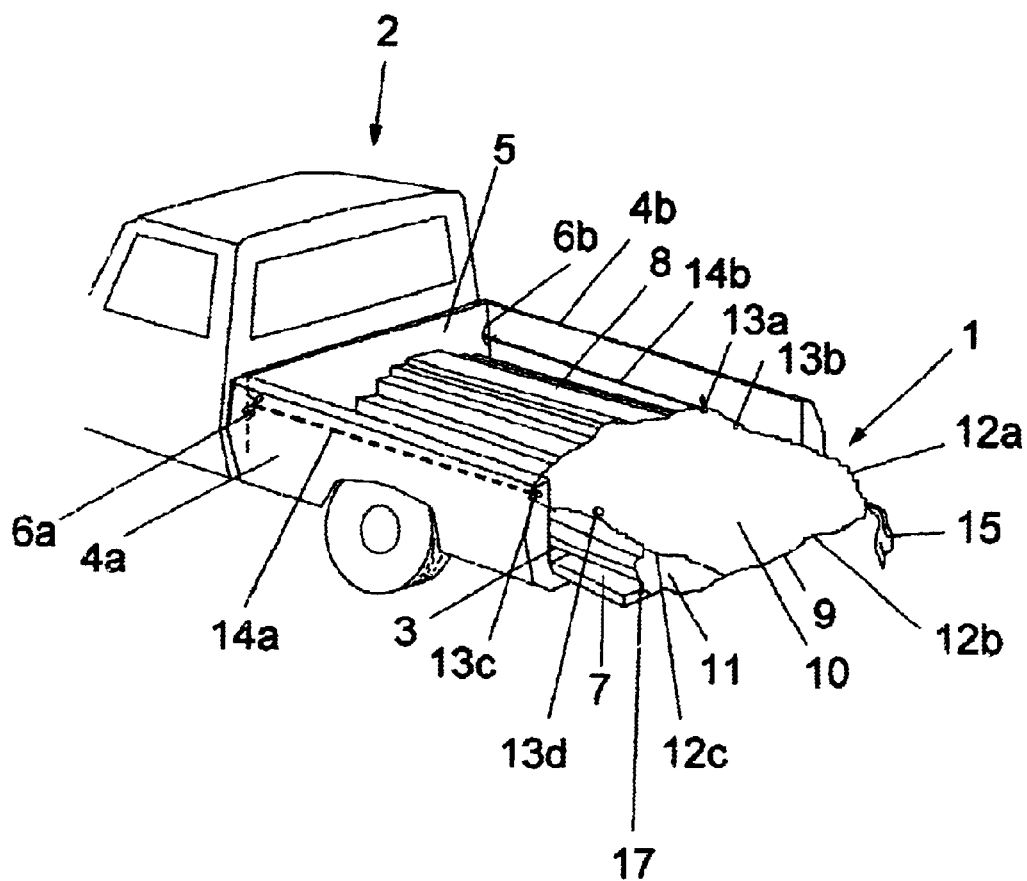
FIG. 1 is a perspective view of a first embodiment of the invention.

Referring now to the drawings, in which like numerals refer to like elements in each, FIG. 1 is a perspective view of a first embodiment of the invention 1, being used in the environment of a pickup truck 2 (by way of example and not limitation). The load carrying part of the truck consists of a horizontal bed 3, sidewalls 4a and 4b, and a bulkhead 5. In this case the bed also contains tie eyes 6a and 6b located facing inward to the bed at the sides of the bulkhead, and a tailgate 7 that is lowered for ease in loading. A typical load of lumber 8 is shown, and it is longer than the combined length of the bed and the tailgate. The invention 1 consists of a flexible bag 9 with an upper side 10 and a lower side 11 connected substantially along three sides 12a (hidden), 12b, and 12c. The upper side is longer than the lower side, and along the edges of the upper side are a plurality of grommets 13a–d (13c hidden by sidewall 4a). The bag is slid over the rearward end of the load. The shortness of the lower side of the bag enables the load to be held in place but with minimal manipulation, e. g., lifting, of the load to accommodate the bag. The upper side of the bag extends further forward along the load to provide additional protection from the slipstream as well as retention of putatively shorter contents combined with long materials. Lengths of rope or the like 14a on one side of the load and 14b on the other side of the load are used to pull the grommets on either side of the load toward a respective tie eye 6a or 6b and thus restrain the load from sliding back or substantially from side to side. The plurality of grommets provides additional securing points along the periphery of the bag and allows the bag to be wound over onto itself and tied for additional load security. The plurality of grommets also serves to divide the tension of the rope among a plurality of locations on the bag and reduce the potential of ripping out a grommet, Grommets may also be fixed to the forward edge 17 of lower side 11 to provide attachment points for another rope or ropes to bind the bag material more closely to the sides of the load (see FIG. 1b for detail). A safety flag 15 or brightly colored area at the rear of the bag are part of the invention. Alternatively the entire bag may be brightly colored.

Figure 1A:
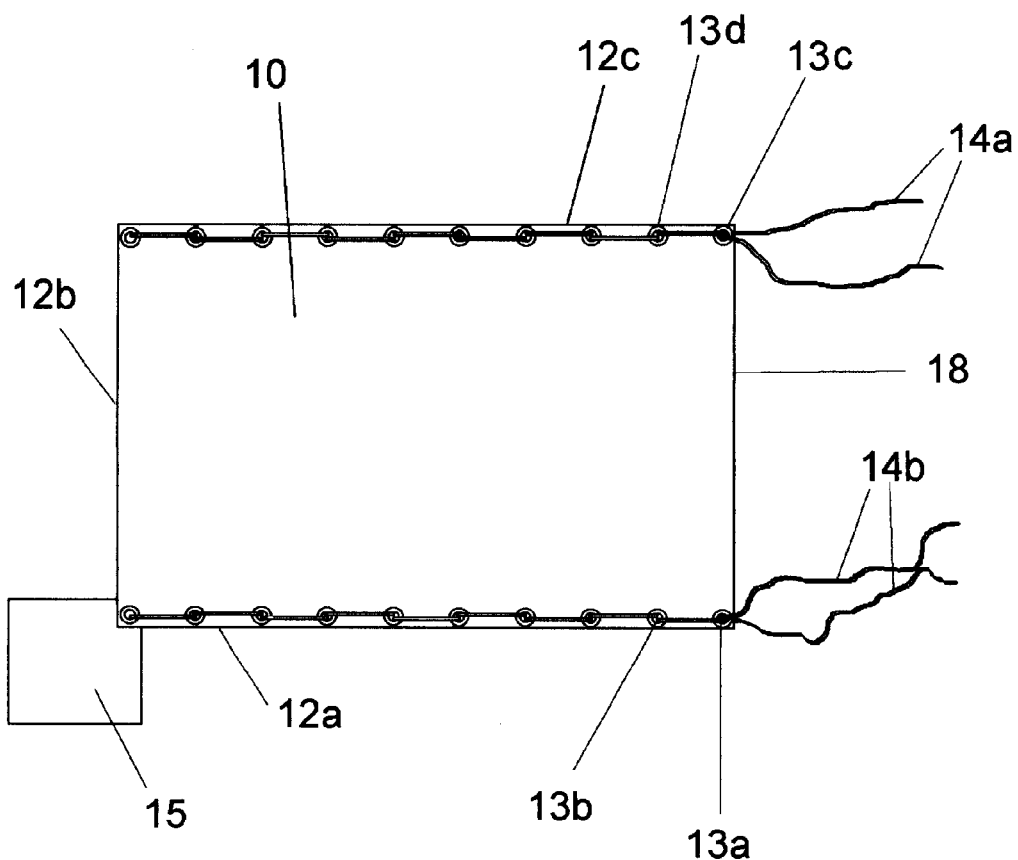
FIG. 1a is a top view of the first embodiment.

FIG. 1a is a top view of the first embodiment more clearly showing the grommets 13 and ropes 14. Also shown is forward edge 18 on top side 10.

Figure 1B:
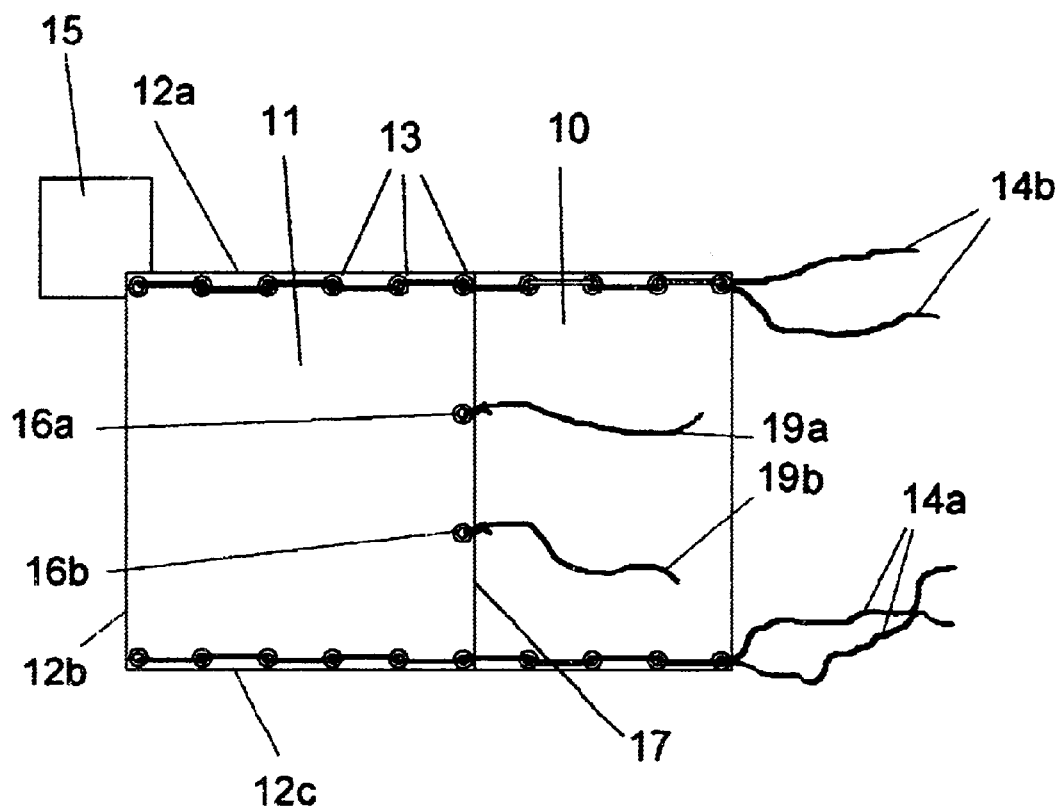
FIG. 1b is a bottom view of the first embodiment.

FIG. 1b is a bottom view of the first embodiment showing grommets 16a and 16b on the forward edge 17 of lower side 11. Ropes 19a and 19b are attached to these grommets respectively. They may be wrapped around the load and tied to each other to provide extra security against splaying of the load and to prevent flapping of excess bag material.

Figure 2:
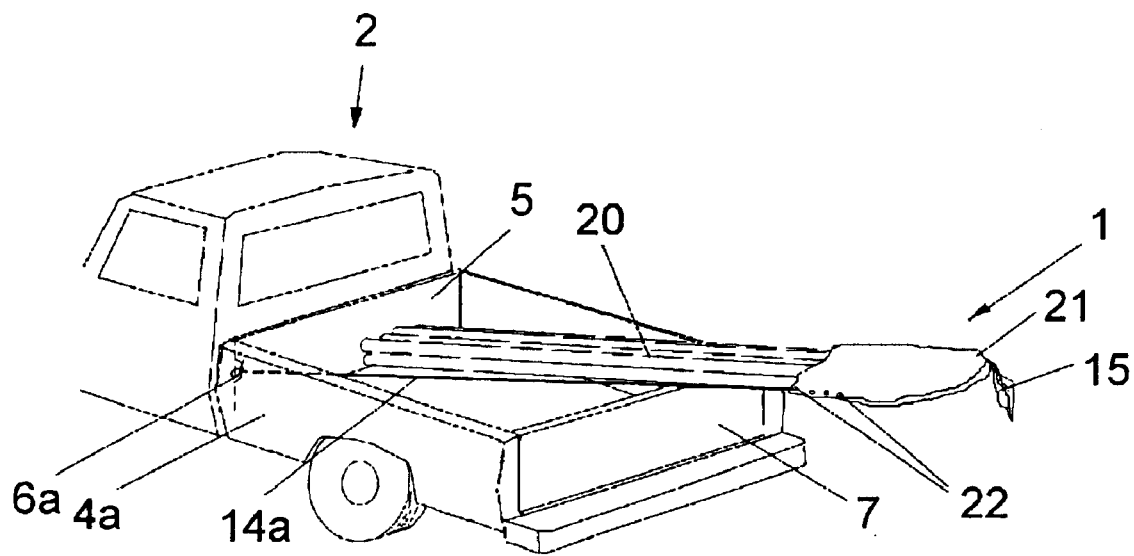
FIG. 2 is a perspective view of a second embodiment of the invention.

FIG. 2 is a perspective view of a second embodiment of the invention designed to constrain bundled contents, e. g., pipe 20. This situation also describes the common instance in which the tailgate 7 is up but the load could tip backward, slide from side to side, or splay apart during transit. In this case the bag 21 is similar to that of FIG. 1 but is of generally smaller width to better accommodate the common situation involving long, thin bundles. Such bundles may only need a plurality of grommets 22 along one side or along two adjacent sides of the bag.

Figure 2A:
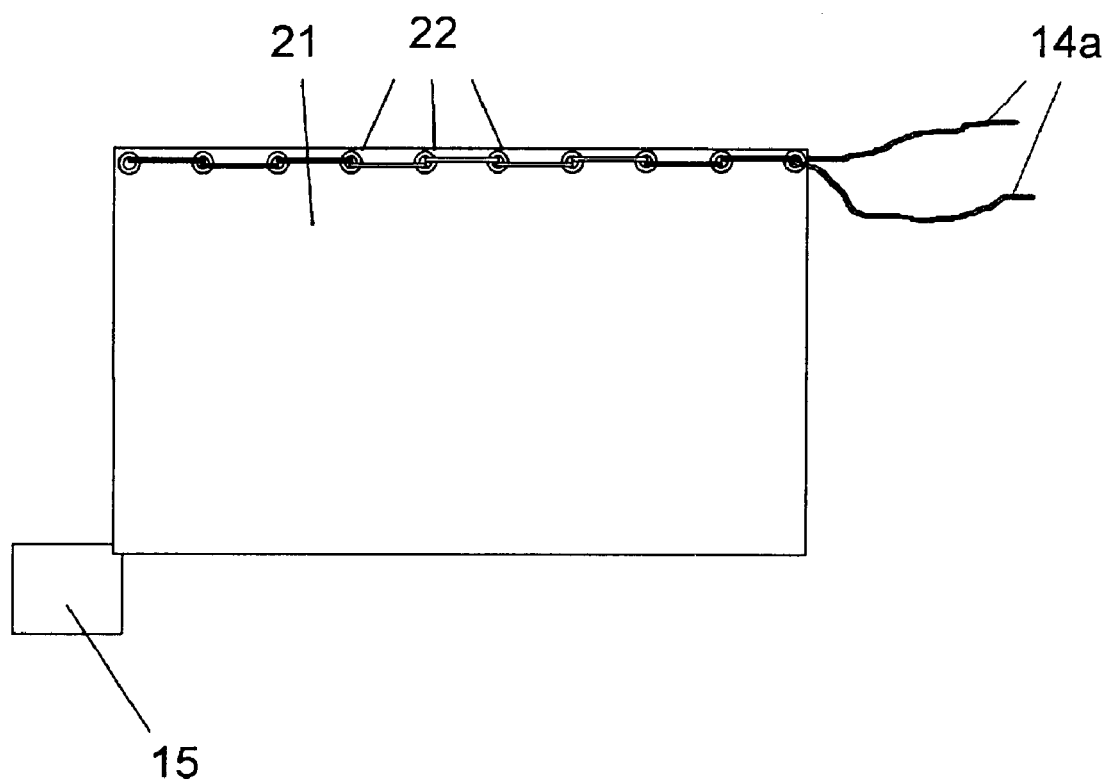
FIG. 2a is a top view of the second embodiment.

FIG. 2a is a top view of the second embodiment of the invention, more clearly showing the grommets 22.

In another embodiment of the invention, not shown in a figure, the bag is formed from a flat shape of thin flexible material having a plurality of grommets, hooks and eyes, and/or snaps making it foldable into a variety of pocket shaped enclosures that can be slid over a load, bound to itself if desired, and tied to attachment points in the bed of the truck.

Figure 3:
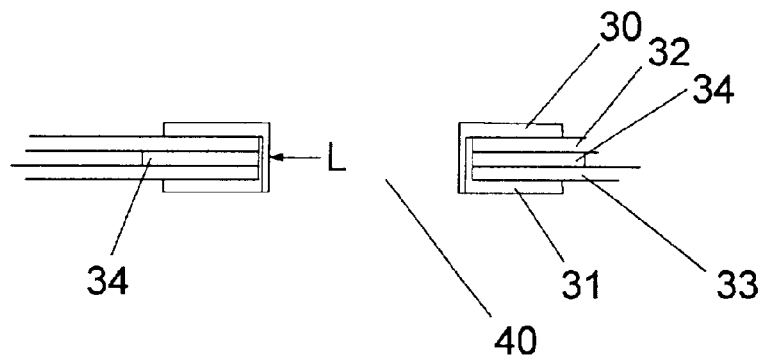
FIG. 3 is a close-up cross-sectional side view of one edge of the invention.

FIG. 3 is a close-up cross-sectional side view of one edge of the invention. It is a reinforced grommet assembly in the invention having three flexible flat layers a first grommet piece 30 and a second grommet piece 31. A top flexible layer 32 and bottom flexible layer 33 sandwich a reinforcement layer 34 comprising a patch only up to about twice the diameter of the grommet rim. The reinforcement layer adds strength to the combination by spreading the shear caused by a load at L over a greater thickness of material, while greatly limiting the amount of additional flexible material needed.

Figure 4:
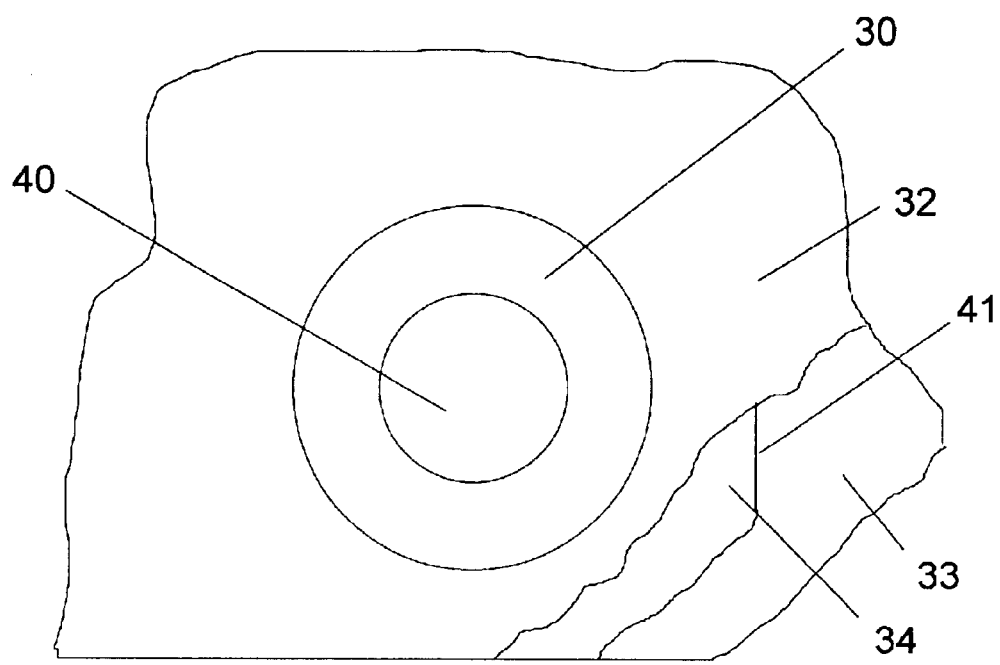
FIG. 4 is a close-up cutaway top view of one edge of the invention.

FIG. 4 is a close-up cutaway top view of one edge of the invention, showing the hole 40 in the grommet and the edge 41 of the reinforcement layer 34.

What is claimed is:

1. A load retaining apparatus in combination with a load and a vehicle wherein:

the load comprises elongate solid material having an upper side, a lower side, a first end and a second end, the first end of the load being held by a cavity in the vehicle;

the load retaining apparatus comprises a bag with a long side, a short side, a closed bottom end, and an open top end;

the long side protruding beyond the short side at the open top end of the bag;

at least one primary flexible tie, each tie hating a proximal end and a distal end, the proximal end being attached to the long side at the open top end of the bag;

the open top end of the bag being placed over the second end of the load so that the long side of bag extends along the upper side of the load; and the distal end of the at least one primary flexible tie being secured to the vehicle under tension, thus applying a retaining force to the bag and pressing the load against the vehicle.

\* \* \* \* \*